US010266972B2

(12) United States Patent
Goering et al.

(10) Patent No.: US 10,266,972 B2
(45) Date of Patent: Apr. 23, 2019

(54) WOVEN PREFORMS, FIBER REINFORCED COMPOSITES, AND METHODS OF MAKING THEREOF

(75) Inventors: Jonathan Goering, York, ME (US); Steve Biddle, Alton, NH (US)

(73) Assignee: Albany Engineered Composites, Inc., Rochester, NH (US)

( * ) Notice: Subject to any disclaimer, the term of this patent is extended or adjusted under 35 U.S.C. 154(b) by 1406 days.

(21) Appl. No.: 12/909,582

(22) Filed: Oct. 21, 2010

(65) Prior Publication Data

US 2012/0100321 A1 Apr. 26, 2012

(51) Int. Cl.
*B32B 1/08* (2006.01)
*D03D 37/00* (2006.01)
(Continued)

(52) U.S. Cl.
CPC .......... *D03D 15/0011* (2013.01); *B29B 11/16* (2013.01); *B29C 70/222* (2013.01); *B29C 70/462* (2013.01); *B32B 5/024* (2013.01); *B32B 5/26* (2013.01); *D03D 3/02* (2013.01); *D03D 3/06* (2013.01); *D03D 13/00* (2013.01);
(Continued)

(58) Field of Classification Search
CPC ......... Y10T 442/3203; Y10T 442/3211; Y10T 442/325; Y10T 428/1362; B32B 1/08; B32B 2605/18; B32B 3/04; B32B 5/024; B32B 5/12; B32B 2605/00; B32B 5/26; B29L 2031/005; B29L 2031/7096; B29C 70/22; B29C 70/462; D03D 25/00; D03D 13/00; D03D 15/011; D03D 3/02; D10B 2403/0333; D10B 2505/02

USPC ...... 442/205, 206, 207, 246, 250, 254; 87/8, 87/9; 156/148; 428/36.1
See application file for complete search history.

(56) References Cited

U.S. PATENT DOCUMENTS

| 4,346,741 A | 8/1982 | Banos et al. |
| 4,535,506 A | 8/1985 | Hendricks et al. |

(Continued)

FOREIGN PATENT DOCUMENTS

| EP | 0 481 772 A | 4/1992 |
| HK | 06-264324 A | 9/1994 |

(Continued)

OTHER PUBLICATIONS

Sharma, Shrikant B. et al.: "Mapping of tubular woven composite performs on to doubly-curved surfaces", *Computer-Aided Design*, 33 (2001), pp. 1035-1048.

(Continued)

*Primary Examiner* — Camie S Thompson
(74) *Attorney, Agent, or Firm* — McCarter & English, LLP (57) ABSTRACT

Preforms for use in fiber-reinforced composites, fiber-reinforced composites, and methods for making thereof are disclosed. One method includes interweaving a plurality of warp yarns with a single weft yarn so as to form a tubular woven structure with a central axis. The preform can be woven using an endless or tubular weaving technique, and can be woven so as to have two or more diameters along a length thereof. The preform can include one or more layers of a fabric formed on or attached to one or both surfaces of the tubular woven structure. The end structure can be a part of a window frame, a wheel rim, or a combustor in a jet engine.

30 Claims, 10 Drawing Sheets (51) Int. Cl.

| | | |
|---|---|---|
| *D04H 3/12* | (2006.01) | |
| *D03D 3/02* | (2006.01) | |
| *D03D 15/00* | (2006.01) | |
| *D03D 3/06* | (2006.01) | |
| *D03D 13/00* | (2006.01) | |
| *B32B 5/02* | (2006.01) | |
| *B32B 5/26* | (2006.01) | |
| *B29B 11/16* | (2006.01) | |
| *B29C 70/22* | (2006.01) | |
| *B29C 70/46* | (2006.01) | |
| *B29L 31/32* | (2006.01) | |
| *B29L 31/00* | (2006.01) | |

(52) U.S. Cl.
CPC ..... *B29L 2031/005* (2013.01); *B29L 2031/32* (2013.01); *B29L 2031/7096* (2013.01); *B32B 2605/00* (2013.01); *D10B 2101/08* (2013.01); *D10B 2101/12* (2013.01); *D10B 2321/021* (2013.01); *D10B 2331/021* (2013.01); *D10B 2403/0333* (2013.01); *D10B 2505/02* (2013.01); *Y10T 428/1362* (2015.01)

(56) References Cited

U.S. PATENT DOCUMENTS

| | | |
|---|---|---|
| 4,753,150 A | 6/1988 | Brown |
| 4,771,518 A | 9/1988 | LaPointe et al. |
| 4,777,859 A | 10/1988 | Plummer, Jr. |
| 5,507,421 A | 4/1996 | Keeton |
| 5,800,514 A | 9/1998 | Nunez et al. |
| 5,904,714 A | 5/1999 | Nunez et al. |
| 5,991,987 A | 11/1999 | Olry et al. |
| 6,086,968 A * | 7/2000 | Horovitz ............ 428/36.1 |
| 6,409,750 B1 | 6/2002 | Hyodoh et al. |
| 6,575,201 B2 | 6/2003 | Buesgen |
| 6,716,239 B2 | 4/2004 | Sowinski et al. |
| 6,767,602 B1 | 7/2004 | Duval et al. |
| 6,814,754 B2 | 11/2004 | Greenhalgh |
| 2003/0056846 A1 | 3/2003 | Buesgen |
| 2005/0228488 A1 | 10/2005 | Nazzaro |
| 2005/0274426 A1 | 12/2005 | Nayfeh et al. |
| 2009/0202763 A1* | 8/2009 | Rose et al. ............ 428/36.1 |
| 2013/0304023 A1 | 11/2013 | Schmitt et al. |

FOREIGN PATENT DOCUMENTS

| | | |
|---|---|---|
| JP | 58-220847 A | 12/1983 |
| JP | 03-045743 A | 2/1991 |
| JP | 07-331556 A | 12/1995 |
| JP | 10-299865 A | 11/1998 |
| WO | WO 03/006866 A | 1/2003 |

OTHER PUBLICATIONS

International Search Report and Written Opinion issued by European Patent Office, acting as ISA, for corresponding international application, PCT/US2011/057108, dated Apr. 9, 2013.

Office action issued by Japanese Patent Office for corresponding Japanese application 2015-225241, dated May 31, 2016, with English translation.

* cited by examiner

WOVEN PREFORMS, FIBER REINFORCED COMPOSITES, AND METHODS OF MAKING THEREOF

BACKGROUND OF THE INVENTION

Field of the Invention

The present invention relates to fiber-reinforced structures. More specifically the present invention relates to woven preforms, fiber-reinforced composites including the woven preforms, and methods of making thereof. The composite structures of the present invention may be used in construction of aircraft structures, such as window frames.

INCORPORATION BY REFERENCE

All patents, patent applications, documents, references, manufacturer's instructions, descriptions, product specifications, and product sheets for any products mentioned herein are incorporated herein by reference, and may be employed in the practice of the invention.

BACKGROUND ART

The use of reinforced composite materials to produce structural components is now widespread, particularly in applications where their desirable characteristics are sought of being light in weight, strong, tough, fatigue resistant, self-supporting and adaptable to being formed and shaped. Such components are used, for example, in aeronautical, aerospace, satellite, recreational (as in racing boats and automobiles), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or braided. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical, and/or other properties. The materials chosen for use as the matrix may or may not be the same as that of the reinforcement preform and may or may not have comparable physical, chemical, thermal or other properties. Typically, however, they will not be of the same materials or have comparable physical, chemical, thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

Frequently, it is desired to produce components in configurations that are other than such simple geometric shapes as plates, sheets, rectangular or square solids, etc. A way to do this is to combine such basic geometric shapes into the desired more complex forms. In any such shapes, a related consideration is to make each juncture between the constituent components as strong as possible. Given the desired very high strength of the reinforcement preform constituents per se, weakness of the juncture becomes, effectively, a "weak link" in a structural "chain".

While the prior art has sought to improve upon the structural integrity of the reinforced composite and has partly achieved success, there exists a desire to improve thereon or address the problem through an approach different from the use of adhesives or mechanical coupling. In this regard, one approach might be by creating a woven three dimensional ("3D") structure by specialized machines. However, the expense involved is considerable and rarely is it desirable to have a weaving machine directed to creating a single structure. Another approach would be to weave a two dimensional ("2D") structure and fold it into 3D shape so that the panel is integrally woven, i.e. yarns are continuously interwoven between the planar base or panel portion and other constituent portions.

Figure 1:
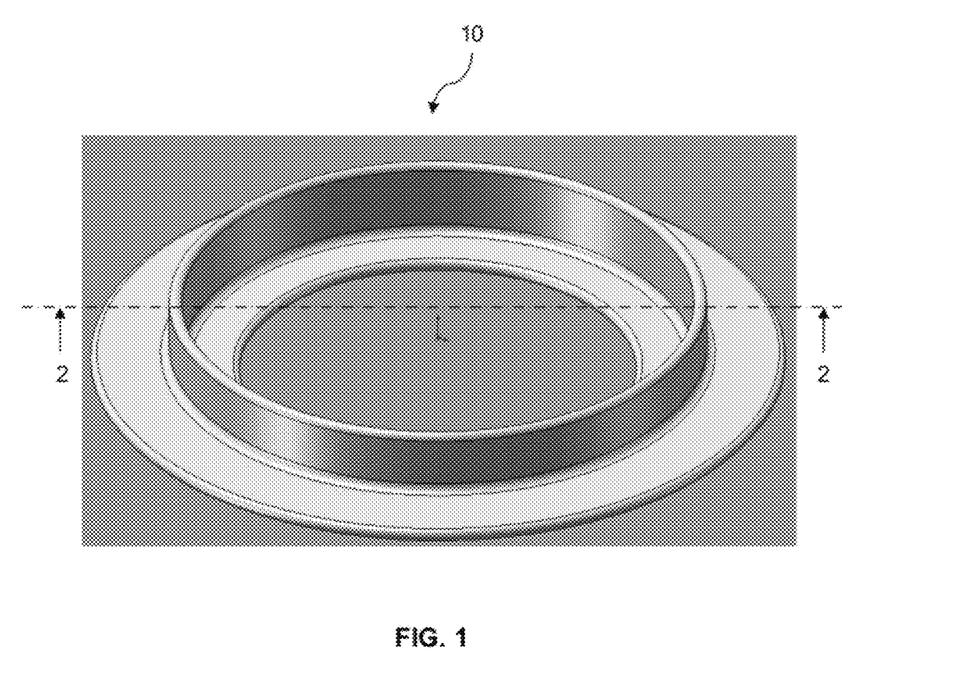
FIG. 1 is a schematic of an aircraft window frame.

The increased use of composite materials having such fiber preform reinforcements in aircraft has led to the need for composite components such as composite window frames. It is more than preferred for these frames to be made from composites because the thermal strain of the window frame must match that of the surrounding structure. A typical geometry of such a window frame 10 is shown in FIG. 1, for example; although these frames can have oval, circular, or any other shape.

Figure 2:
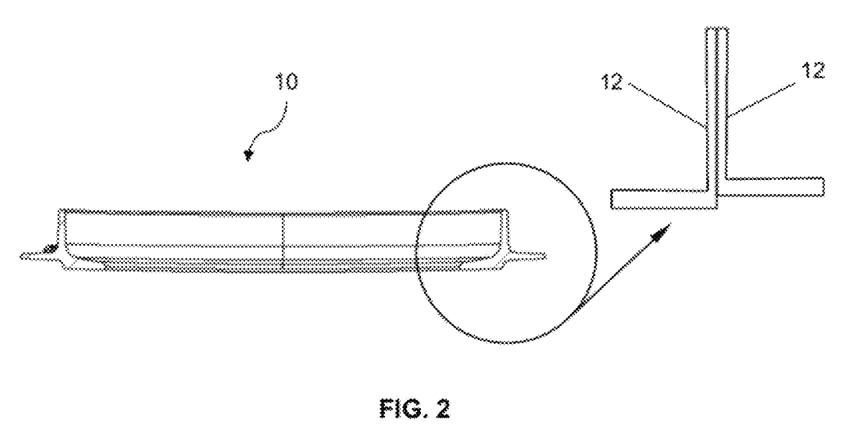
FIG. 2 is a cross-sectional view of the aircraft window frame shown in FIG. 1.

The cross sectional shapes of these window frames 10 can typically be broken into a series of 'T', 'L' and/or 'U' shapes. The cross sectional shape for the window frame 10 in FIG. 1, for example, can be generated as a pair of 'L' shapes 12 placed back-to-back, as shown in FIG. 2, for example.

Aerospace structures often contain components that have axisymmetric geometries (i.e. geometries symmetric along an axis) such as that discussed above. Other aircraft components which may use structures as described above are wheel rims, containment rings, and combustors in a jet engine, for example. Many techniques for fabricating fiber reinforced preforms with an axisymmetric shape exist. They include contour weaving, braiding, and filament winding. Each of these techniques has benefits and drawbacks; however, none of them can be used to make a single tubular preform in a shape that has segments which are concentric.

SUMMARY OF THE INVENTION

Accordingly, one exemplary embodiment of the present invention is a method for weaving seamless fiber preforms that can be formed to complex axisymmetric shapes that have one or more concentric segments. Window frames and combustors in airframe and engine structures are some examples of structures that use such shaped preforms. The method involves weaving engineered tubes, which are commonly referred to as 'socks' in the fiber-reinforced composites art. The socks are woven flat, but open into the desired three dimensional shapes. These preforms can then be processed into composite components using processes such as resin transfer molding or chemical vapor infiltration.

The method according to this embodiment generally includes the steps of interweaving a plurality of warp yarns with a single weft yarn, thereby forming a tubular woven structure having a central axis. The preform can be woven seamless so as to have two or more diameters along a length thereof. The method further includes the step of folding a first portion of the preform having a larger diameter onto a second portion of the preform having a smaller diameter along the central axis, and optionally folding a third portion of the preform having the smallest diameter into the second portion of the preform. The preform can be formed so that it conforms to a mandrel having a predetermined shape. The plurality of warp yarns can be parallel to the central axis of the preform, and the weft yarn can be parallel to the hoop direction of the preform.

One exemplary embodiment of the present invention is a seamless preform for use in a fiber-reinforced composite. The preform includes a plurality of warp yarns interwoven with a single weft yarn, thereby forming a tubular woven structure having a central axis. The plurality of warp yarns can be interwoven with the single weft yarn using endless or tubular weaving technique. The preform can have two or more diameters along a length thereof such that a first portion of the preform having a larger diameter can be folded onto a second portion of the preform having a smaller diameter along the central axis. A third portion of the preform can optionally be folded into the second portion. The preform can be formed so that it conforms to a mandrel having a predetermined shape. The plurality of warp yarns can be parallel to the central axis of the preform, and the weft yarn can be parallel to the hoop direction of the preform.

Another exemplary embodiment of the present invention is a fiber-reinforced composite including the preform described above. The fiber-reinforced composite can include a matrix material, wherein the matrix material is a resin selected from the group consisting of epoxy, polyester, vinyl-ester, ceramic, carbon and combinations thereof. The fiber-reinforced composite can be a part of an engine combustor or an aircraft window frame, for example.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred, but non-limiting, embodiments of the invention are illustrated and the accompanying drawings in which corresponding components are identified by the same reference numerals.

Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings.

DETAILED DESCRIPTION OF THE PREFERRED EMBODIMENTS

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

In the following description, like reference characters designate like or corresponding parts throughout the figures. Additionally, in the following description, it is understood that such terms as "upper," "lower," "top," "bottom," "first," "second," and the like are words of convenience and are not to be construed as limiting terms.

Figure 3:
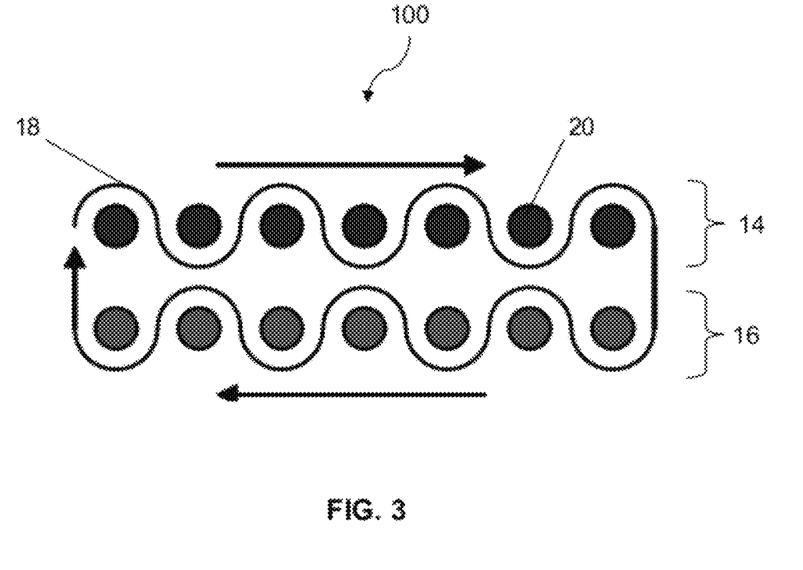
FIG. 3 is a schematic of a step involved in a method according to one aspect of the present invention.

Turning now to the figures, FIG. 3 illustrates a step involved in a method for weaving a seamless preform 100, according to one exemplary embodiment of the present invention. The method involves weaving a seamless preform or engineered tube 100, which is commonly referred to as a 'sock' in the fiber-reinforced composites art. The sock is woven flat, but opens into a desired three dimensional shape when conformed onto a mandrel having the desired dimensions.

The method according to this embodiment uses at least two layers 14, 16 of warp fiber or yarn 20 on the loom. Weft fiber or yarn 18 is typically inserted using a shuttle that continuously traverses along the width of the loom so the preform will have a closed edge, and therefore has continuous reinforcement in the hoop direction. In such an arrangement, when the shuttle moves in one direction, for example left to right, weft fiber or yarn 18 weaves with the warp fiber or yarn 20 in the top layer 14 and when it moves from right to left, it weaves with the warp fiber 20 in the bottom layer 16. Since the weft fiber or yarn 18 is coming off a shuttle, the fiber or yarn 18 weaving the top 14 and bottom layers 16 are connected on the edges, as shown in FIG. 3, for example.

Figures 4A, 4B:
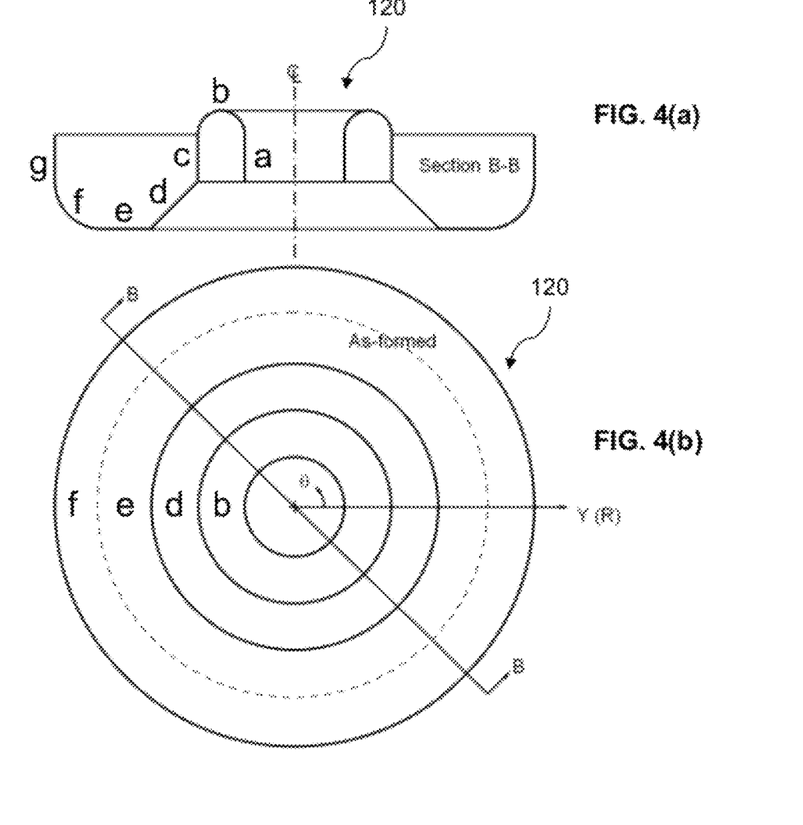
FIG. 4(a) is a cross-sectional view of a woven seamless preform according to one aspect of the present invention.
FIG. 4(b) is a top view of a woven seamless preform according to one aspect of the present invention.

Using the tubular weaving technique described above, one exemplary embodiment of the present invention is a method for weaving seamless fiber preforms 120 that can be formed into complex axisymmetric shapes (i.e. shapes with rotational symmetry about a central axis) that have one or more concentric segments, such as that shown in FIG. 4(b), for example, which is a top-view of a seamless fiber preform 120 woven using the instant tubular weaving technique. FIG. 4(a) shows a cross-sectional view of the same structure along the imaginary line B-B depicting different segments 'a' through 'f' of the fiber preform 120. As it can be envisioned from FIGS. 4(a) and 4(b), segments 'a', 'c', and 'g' of the preform are concentric, as are segments 'b', 'd', 'e', and 'f'. Because FIG. 4(b) is a top-view of the fiber preform 120, segments 'a', 'c', and 'g' cannot be seen in this figure as they are formed in a vertical plane or along the z-axis of a three-dimensional coordinate system. Although a preferred embodiment of the woven preform 120 is shown in FIGS. 4(a)-4(b), the present invention is not restricted as such, and it can practically use any variation of the tube weaving technique to produce a seamless preform that can be shaped into a structure with concentric segments.

Figure 5:
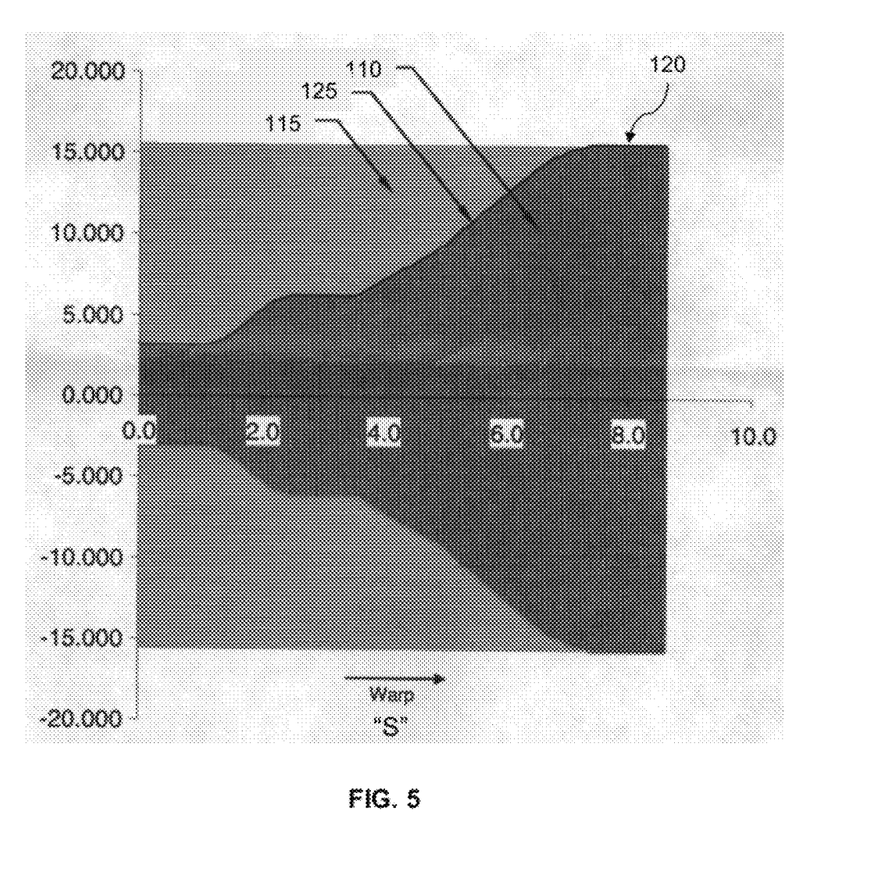
FIG. 5 is a top view of a flat woven seamless preform as seen on the weaving loom.

Preform 120 can be woven by varying the number of warp fibers or yarns 20 that actually weave into the preform 120 so that the length of each pair of weft fibers 18 (that form an individual ring in the tube) varies along the length of the preform 120. This results in a tubular preform 120 that has a varying diameter along its length, as shown in FIG. 5, for example. FIG. 5, which is a top view of a flat woven preform 120 on the loom, has a woven portion 110 wherein all warp yarns 20 are interwoven with weft yarn 18, and a partially woven portion 115 where only some of the warp yarns 20 are woven with weft yarn 18 to form a tube of a smaller diameter when compared to woven portion 110. Edges of the preform are indicated by arrows 125, which are practically seamless due to the fact that the shuttle carrying weft yarn 18 continuously traverses along the width of the loom while weaving the preform 120.

Figure 6A:
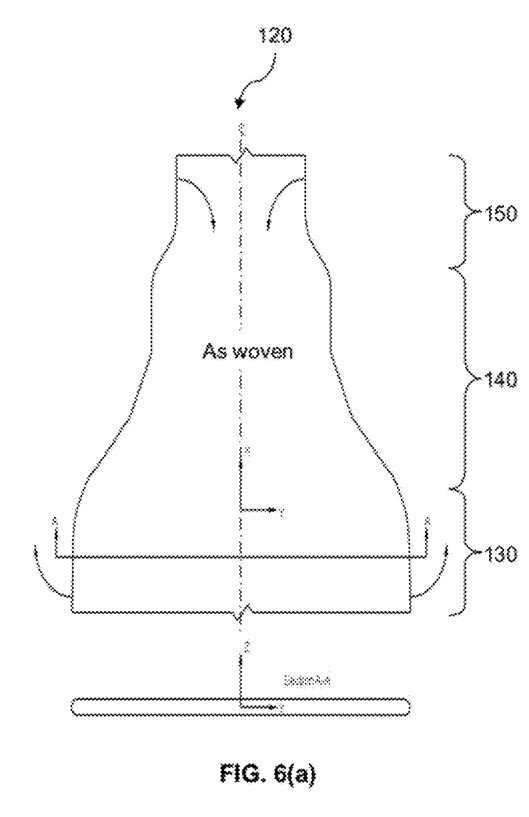
FIGS. 6(a) and 6(b) are a schematic of a step involved in a method according to one aspect of the present invention.
Figure 6B:
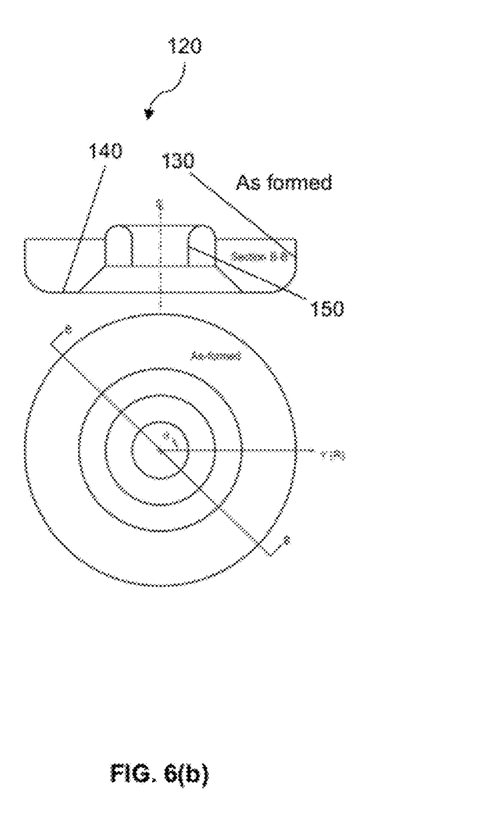
Figure 7:
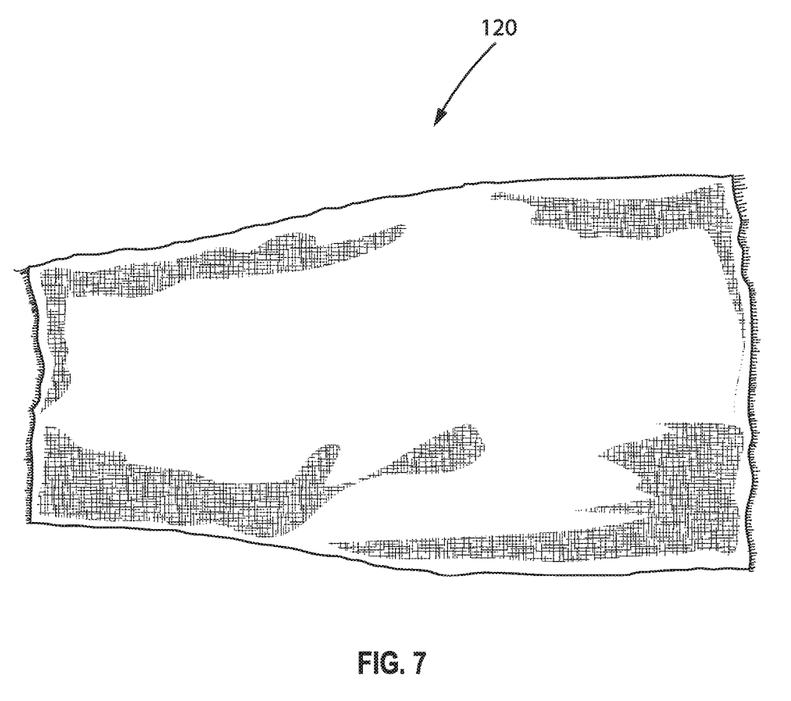
FIG. 7 is illustrates a woven seamless preform according to one aspect of the present invention.
Figure 8:
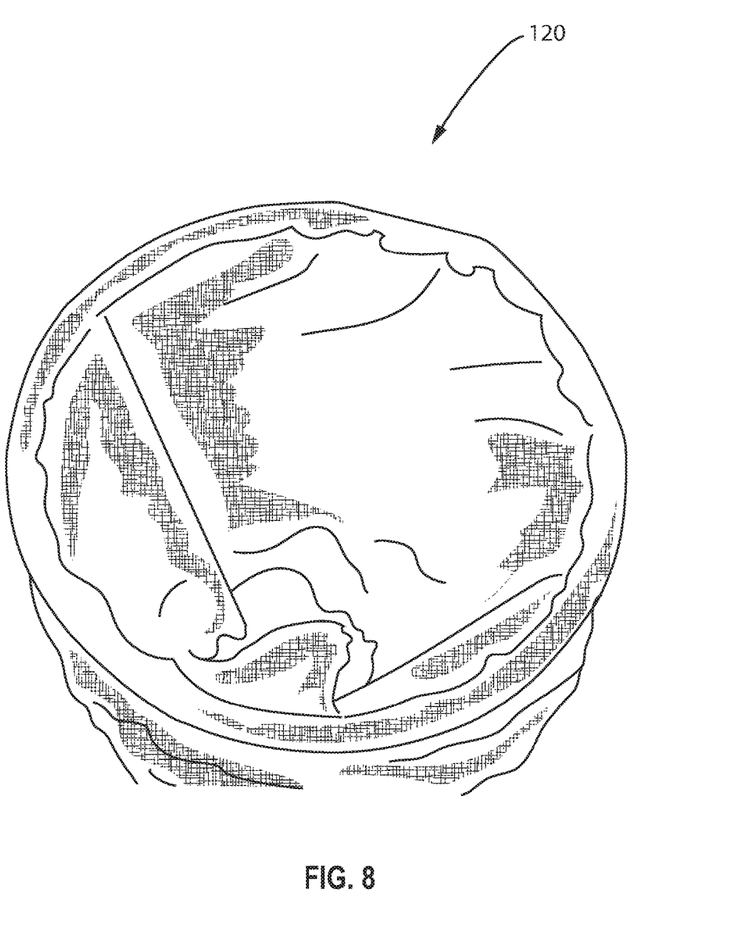
FIG. 8 is illustrates a woven seamless preform according to one aspect of the present invention.

After the woven preform 120 is taken off the loom, it is trimmed along its edges 125 to sever the unwoven portions of warp yarns 20 and to form a smooth surface on the outside of preform 120, resulting in a structure such as that shown in FIG. 7, for example. It is then placed on a mandrel of a desired shape, and a first portion 130 of the preform having a larger diameter is folded onto a second portion 140 having a smaller diameter along the preform's central axis, as shown in FIG. 6(a). Further, a third portion 150 having the smallest diameter can be folded inwardly to form a folded preform 120, as shown in FIG. 6(b), for example. It should be noted, however, that the plurality of warp yarns 20 are always running along the central axis of the preform, and weft yarn 18 is always parallel to the hoop direction of the preform 120, thereby providing continuous hoop reinforcement.

These seamless preforms, as one can imagine, are engineered to form the desired shape without forming wrinkles. This is a significant benefit over any method that may require darting and hand work to smooth the preform. In addition, the resulting structure has continuous reinforcement in the hoop direction, which improves mechanical strength of the entire structure.

Figure 9:
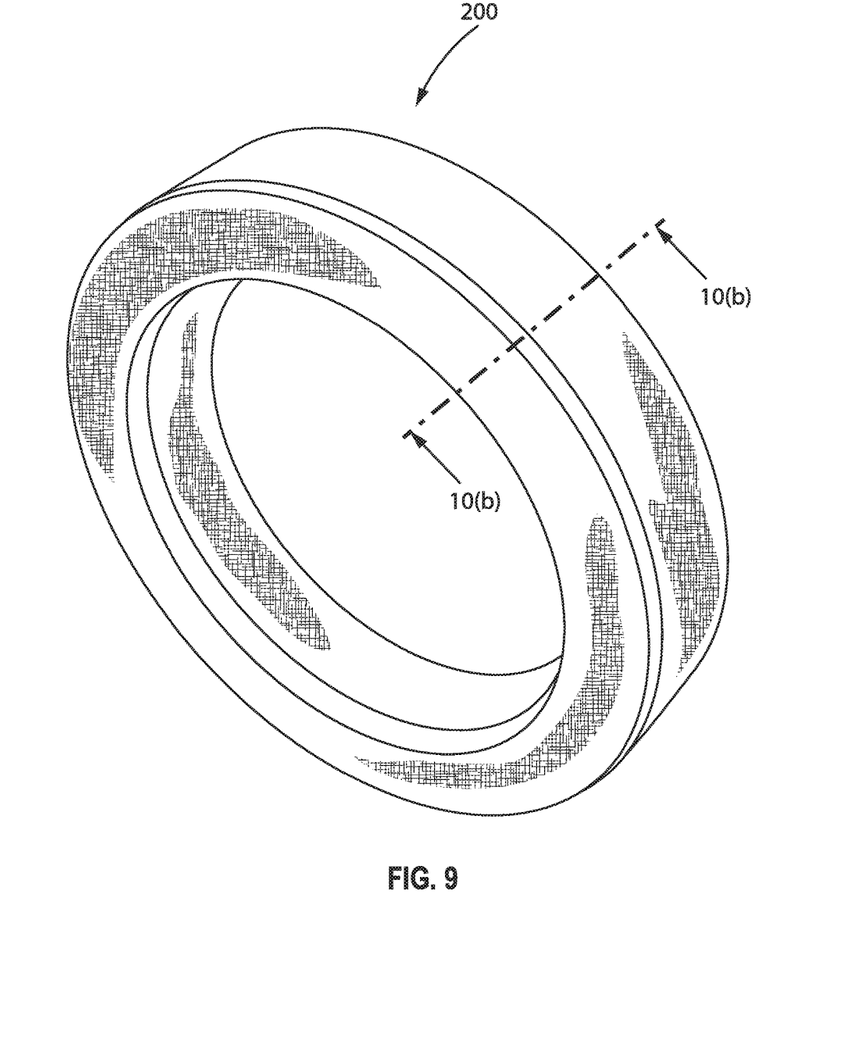
FIG. 9 is illustrates a woven seamless preform according to one aspect of the present invention.

The invention according to a further exemplary embodiment is a method for weaving a seamless preform 200, as shown in FIG. 9, for example. This example has a 'U' shaped cross section, but it should be obvious that an 'L' is possible by eliminating one of the upstanding legs of the 'U'. The method uses the sock or tube weaving technique described in the above embodiments. However, the seamless preform 200 in this case has two portions 230, 250 with constant diameters and a transition portion 240 where the preform goes from a smaller diameter portion 250 to larger diameter portion 230.

Figure 10A:
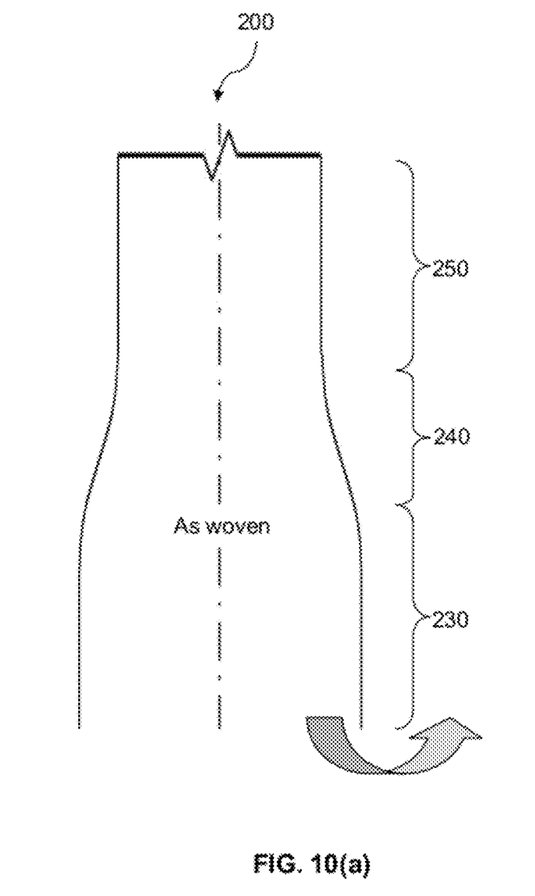
FIGS. 10(a) and 10(b) are a schematic of a step involved in a method according to one aspect of the present invention.
Figure 10B:
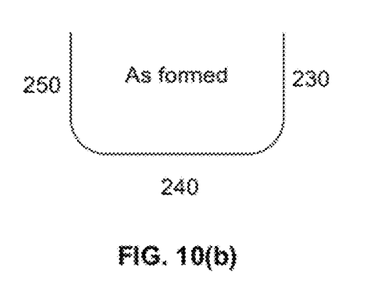

After the woven preform 200 is taken off the loom, it is trimmed along its edges to sever the unwoven portions of warp yarns 20 and to form a smooth surface on the outside of preform 200. It is then placed on a mandrel of a desired shape, in this case a 'U' shaped mandrel, and a first portion 230 of the preform having a larger diameter is folded onto a second portion 240 having a smaller diameter along the preform's central axis, as shown in FIG. 10(a). Further, a third portion 250 having the smallest diameter can be folded inwardly to form a folded preform 200, as shown in FIG. 10(b), for example. Forming folded portions in the preform is also referred to as putting 'cuffs' in the preform. It should be noted, however, that the plurality of warp yarns 20 are always running along the central axis of the preform, and weft yarn 18 is always parallel to the hoop direction of the seamless preform 200, thereby providing continuous hoop reinforcement.

Defining the shape of this woven preform is facilitated by working in a two-dimensional coordinate system that follows the curve defining the cross section of the desired structure. This is the "s" coordinate shown in FIG. 5, for example, where the warp direction is indicated by an arrow along the x-axis, and the weft direction is along the y-axis of the coordinate system. This coordinate corresponds to the location of a pair of weft fibers in the warp direction. The required length of the weft fiber at a specific "s" location is defined by calculating the perimeter of the desired structure at that same location. In effect, this process unfolds and flattens the concentric structure as shown in FIG. 5.

Since the seamless preform has been engineered to have the proper length of weft fiber at each "s" location along the warp direction, it will take the desired shape without forming wrinkles. This is a significant benefit over methods that may require darting and hand work to smooth the preform. In addition, the resulting structure has continuous reinforcement in the hoop direction, which improves mechanical strength of the entire structure.

Although a single layered structure is described in the embodiments disclosed herein, the present invention is not limited as such, and structures or preforms having a multi-layer structure including more than two warp layers and more than one weft yarn can be produced by one skilled in the art without departing from the spirit and scope of the invention. The multilayered structure can also include one or more layers of a fabric formed on or attached to one or both surfaces of the tubular woven structure. The additional layer can be a lay-up, a flat woven, an endless woven, a nonwoven, a braided or a knitted structure.

Similarly, although structures having just two or three different diameters are disclosed herein, the present invention is not limited as such, and structures with concentric segments having practically any number of diameters can be produced using the methods of the present invention.

The methods disclosed herein are applicable to practically any fiber that can be machine woven, and practically any pattern can be used in the main body of the preform (i.e. plain weave, twill, satin, etc.). Similarly, the warp and/or weft yarns used in the present invention can be made of a material selected from the group consisting of glass, carbon, ceramic, aramid, polyethylene, polyester, polyamide and other materials which exhibit desired physical, thermal, chemical and/or other properties. Through the use of such reinforcement materials, which ultimately become a constituent element of the completed composite, the desired characteristics of the reinforcement materials, such as very high strength, are imparted to the completed composite component. The warp and/or weft yarns used in the present invention can be monofilaments, multifilaments, twisted multifilaments, plied multifilaments, untwisted tows, cabled, or braided structures.

After the desired reinforcement preform 120, 200 has been constructed, matrix material may be introduced to and into the preform 120, 200 using resin transfer molding or chemical vapor infiltration so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical, and/or other properties. The final structure may be cured using methods commonly known in the art, thus forming composites which can form a part of a window frame, a wheel rim, or a combustor in a jet engine, for example.

Although preferred embodiments of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

The invention claimed is:

1. An axisymmetric preform for use in a fiber-reinforced composite, the preform comprising:
   a seamless tubular woven structure having a central axis formed from two or more layers of warp yarn interwoven with one or more weft yarns having two or more diameters along a length thereof,
   wherein a first portion of the preform having a larger diameter is folded onto a second portion of the preform having a smaller diameter along the central axis.

2. The preform according to claim 1, wherein the two or more layers of warp yarn interwoven with one or more weft yarns using endless or tubular weaving technique.

3. The preform according to claim 1, wherein a third portion of the preform having the smallest diameter is folded into the second portion of the preform.

4. The preform according to claim 1, wherein the preform conforms to a mandrel having a predetermined shape.

5. The preform according to claim 1, wherein the warp yarns are along a central axis of the preform.

6. The preform according to claim 1, wherein the weft yarn is, parallel to the hoop direction of the preform.

7. The preform according to claim 1, wherein the warp yarns and/or weft yarn are made of a material selected from the group consisting of glass, carbon, ceramic, aramid, polyethylene, and derivatives thereof.

8. The preform according to claim 1, wherein the plurality of warp yarns and/or the single weft yarn are monofilaments, multifilaments, twisted multifilaments, plied multifilaments, untwisted tows, cabled, or braided structures.

9. The preform according to claim 1, wherein the preform is a multilayered structure.

10. The preform according to claim 9, wherein the multilayered structure comprises one or more layers of a fabric formed on or attached to one or both surfaces of the tubular woven structure.

11. The preform according to claim 10, wherein the fabric is a lay-up, flat woven, endless woven, nonwoven, braided or knitted structure.

12. A fiber-reinforced composite comprising the preform according to claim 1.

13. The fiber-reinforced composite according to claim 12, further comprising a matrix material.

14. The fiber-reinforced composite according to claim 13, wherein the matrix material is a resin selected from the group consisting of epoxy, polyester, vinyl-ester, ceramic, carbon and derivatives thereof.

15. The fiber-reinforced composite according to claim 12, wherein the composite is a part of a window frame, a wheel rim, or a combustor in a jet engine.

16. A method for forming a seamless axisymmetric preform for use in a fiber reinforced composite, the method comprising the steps of:
   interweaving two or more layers of warp yarn with one or more weft yarns, thereby forming a tubular woven structure having a central axis and two or more diameters along a length thereof; and
   folding a first portion of the preform having a larger diameter onto a second portion of the preform having a smaller diameter along the central axis.

17. The method according to claim 16, wherein the two or more layers of warp yarn interwoven with one or more weft yarns using endless or tubular weaving technique.

18. The method according to claim 16, further comprising the step of:
   folding a third portion of the preform having the smallest diameter into the second portion of the preform.

19. The method according to claim 16, wherein, the preform conforms to a mandrel having a predetermined shape.

20. The method according to claim 16, wherein the warp yarns are parallel to the central axis of the preform.

21. The method according to claim 16, wherein the weft yarn is parallel to the hoop direction of the preform.

22. The method according to claim 16, wherein the warp yarns and/or weft yarn are made of a material selected from the group consisting of glass, carbon, ceramic, aramid, polyethylene, and derivatives thereof.

23. The method according to claim 16, wherein the warp yarns and/or weft yarns are monofilaments, multifilaments, twisted multifilaments, plied multifilaments, untwisted tows, cabled, or braided structures.

24. The method according to claim 16, further comprising the step of: forming or attaching one or more layers of a fabric on one or both surfaces of the tubular woven structure, thereby forming a multilayered structure.

25. The method according to claim 24, wherein the fabric is a lay-up, woven, endless woven, nonwoven, braided or knitted structure.

26. A method for forming a fiber-reinforced composite, the method comprising the steps of claim 16.

27. The method according to claim 26, further comprising the step of: at least partially impregnating the preform in a matrix material.

28. The method according to claim 27, wherein the matrix material is a resin selected from the group consisting of epoxy, polyester, vinyl-ester, ceramic, carbon and derivatives thereof.

29. The method according to claim 27, further comprising the step of: at least partially curing the matrix material.

30. The method according to claim 26, wherein the composite is a part of a window frame, a wheel rim, or a combustor in a jet engine.

* * * * *